E. G. DOLAND.
SLED BRAKE.
APPLICATION FILED NOV. 24, 1908.
930,055.
Patented Aug. 3, 1909.
2 SHEETS—SHEET 2.
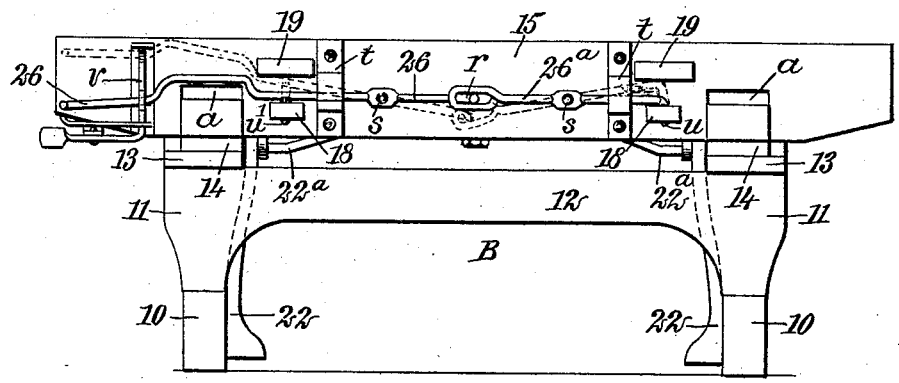
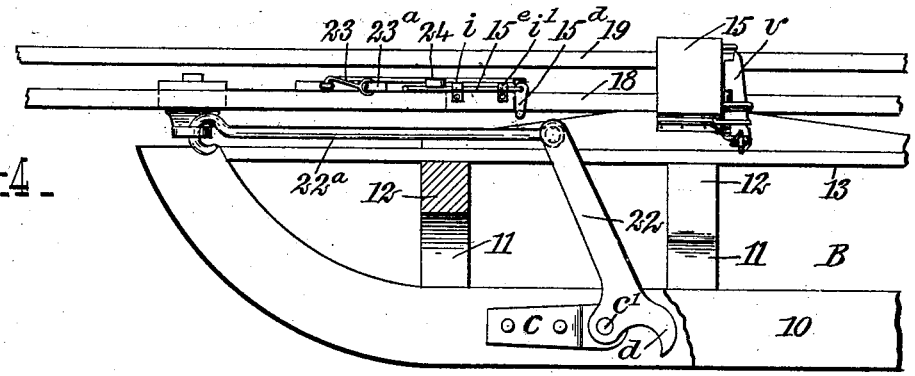
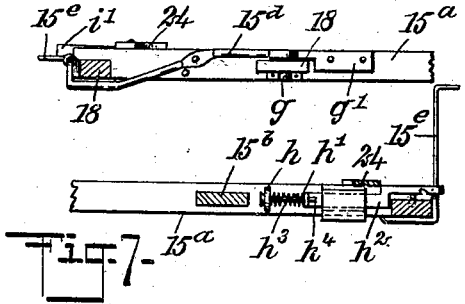
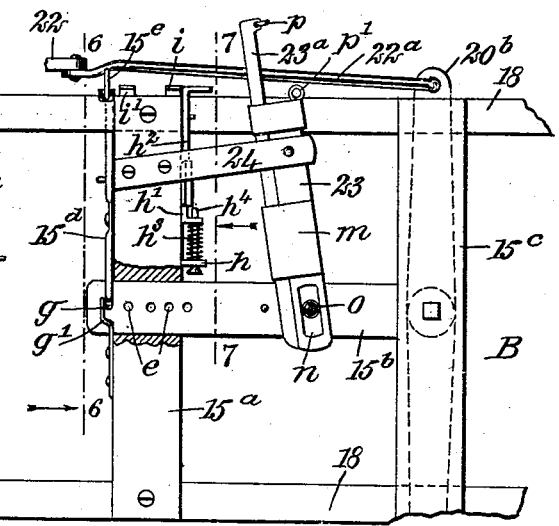
WITNESSES
INVENTOR
Eben G. Doland
BY
ATTORNEYS

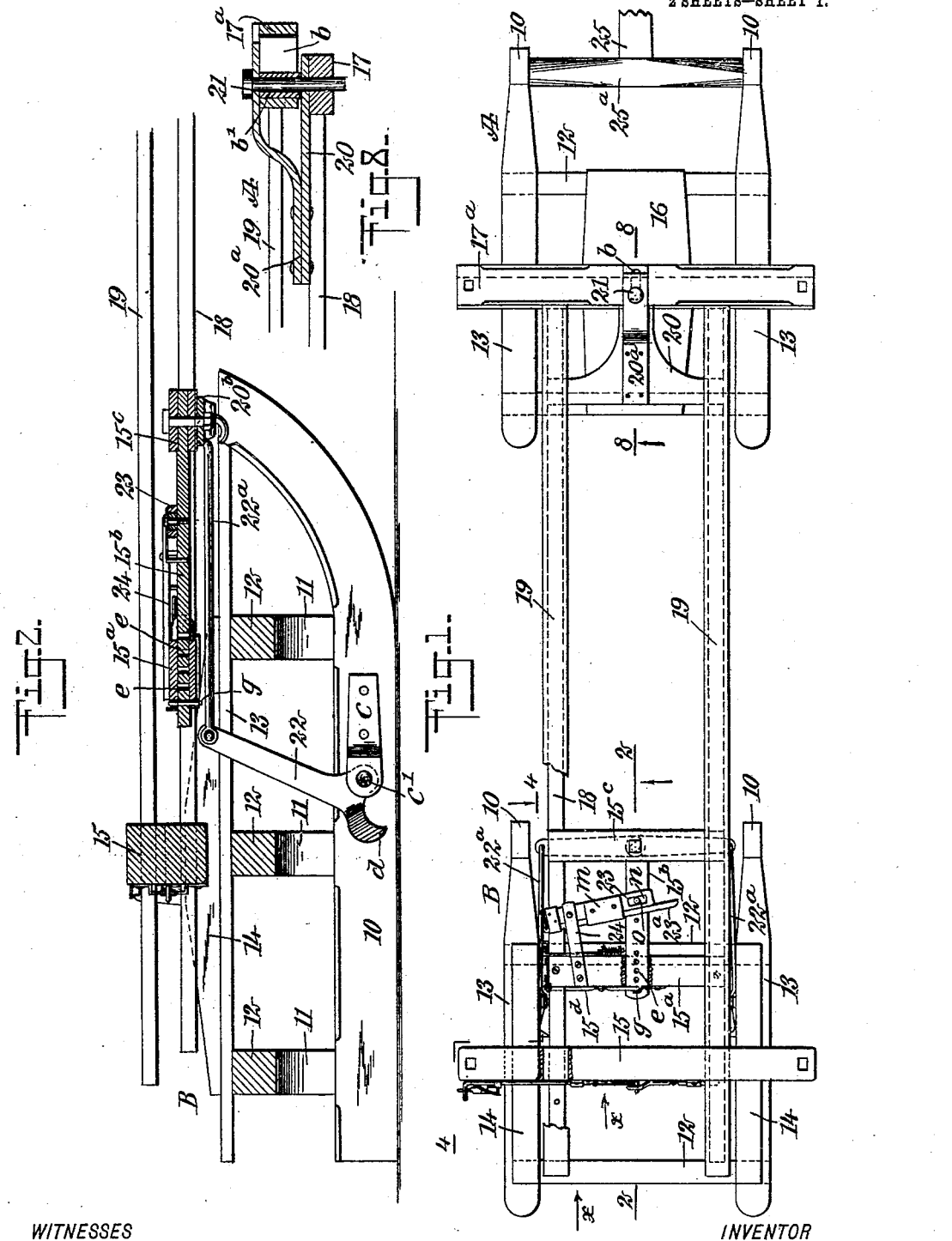

UNITED STATES PATENT OFFICE.

EBEN G. DOLAND, OF STARKSBORO, VERMONT.

SLED-BRAKE.

No. 930,055.  Specification of Letters Patent.  Patented Aug. 3, 1909.

Application filed November 24, 1908. Serial No. 464,245.

*To all whom it may concern:*

Be it known that I, EBEN G. DOLAND, a citizen of the United States, and a resident of Starksboro, in the county of Addison and State of Vermont, have invented a new and Improved Sled-Brake, of which the following is a full, clear, and exact description.

This invention relates to brakes for freight hauling sleds, consisting of two sections coupled together in sequence and technically known as bobsleds.

The purpose of my invention is to provide novel details of construction for a brake for a bob sled, which are simple and convenient to operate, enabling the application of the brake when the sled is moving or stationary on an inclined or level roadbed; and a further object is to so construct and arrange details of the improved brake mechanism, that the toes or frictional members on the brake levers may be caused to project more or less below the tread members of the sled runners, as their effective service may require.

The invention consists in the novel construction and combination of parts as is hereinafter described, and defined in the appended claims.

Reference is to be had to the accompanying drawings forming a part of this specification, in which similar characters of reference indicate corresponding parts in all the views.

Figure 1 is a plan view of a bob-sled, and of the improved brake mechanism thereon; Fig. 2 is an enlarged longitudinal sectional view of the rear section of the bob-sled and of novel details thereon, taken substantially on the line 2—2 in Fig. 1; Fig. 3 is a rear end view of the rear section of the sled, and of details of the improvement thereon, seen in the direction of the arrow $x$ in Fig. 1; Fig. 4 is an enlarged, broken and partly sectional side view of the rear section of the bob-sled, and a side view of novel details thereon, the section being on the line 4—4 in Fig. 1; Fig. 5 is an enlarged plan view of the improved brake mechanism, mounted on a portion of the rear sled section; Fig. 6 is a transverse sectional view of novel details, taken substantially on the line 6—6 in Fig. 5; Fig. 7 is a transverse sectional view of novel features, taken substantially on the line 7—7 in Fig. 5; and Fig. 8 is a longitudinal sectional view of details taken substantially on the line 8—8 in Fig. 1.

The sled sections A, B, which are substantially similar in shape and dimensions, form a bob-sled when connected together in sequence, the section A being the forward one of the pair. Each sled section is made up of two runners 10, 10 on which similar knees 11 are secured at equal distances apart on each runner, said knees in opposite pairs being connected at their upper ends by cross bars 12.

Above the runners on each sled section A, B, cap pieces 13 are secured upon opposite ends of the cross bars; these longitudinally disposed cap pieces, that are parallel with the runners 10, extend from the front ends thereof to points above their rear ends, as shown for one runner in Fig. 2. Upon each cap piece 13 on the rear sled section B, a reinforce block 14 is secured, said reinforce blocks receiving a rear bolster 15, which is notched at $a$ near each end thereof for loosely embracing the reinforce pieces, whereon the bolster is rockably secured by any suitable means not shown.

Centrally upon the cross bars 12 on the front sled section A, a longitudinally disposed wear plate 16 is secured, whereon a transverse bolster 17 is loosely mounted. Upon the bolster 17 the forward ends of two reach bars 18 are secured at equal distances from its transverse center, and thence extend rearward parallel with each other, and near their rear ends pass loosely through slots in the rear bolster 15 near the lower side of the latter.

A complementary front bolster 17$^a$ is employed, from which extend two spacing bars 19 through transverse slots in the rear bolster 15 directly above the reach bars 18, and wherein said spacing bars are firmly secured, the latter having such a length as will locate the top bolster 17$^a$ over the lower bolster 17.

As shown in Figs. 1 and 8, a draft plate 20 is provided having two opposite limbs that extend laterally from a central member that extends forwardly, the lateral limbs being seated upon and secured to the reach bars 18, and the central member mounted upon and secured to the lower bolster bar 17. Upon the rear portion of the draft plate 20, a corresponding end portion of a clip plate 20$^a$ is secured, said plate being bent upward and forward, seating upon the upper bolster 17$^a$, above a transverse slot $b$ in said bolster.

A draft bolt 21 is inserted down through opposite perforations in the draft plate 20 and clip plate 20$^a$, and also through a thimble $b'$ that loosely occupies the slot $b$, and it will be seen that the lower bolster bar 17 and reach bars 18 are thus adapted to receive longitudinal movement a distance limited by the length of the slot $b$.

The lower bolster bar 17 is seated upon the wear plate 16 when the two sled sections, A, B, are connected for service, and is loosely secured thereon by an insertion of a downwardly extended portion of the draft bolt 21 through a perforation formed in the wear plate 16 near its center.

Upon the inner surfaces of the rear pair of runners 10 two brake levers 22 are rockably supported by pivots $c'$ that pass through clip plates $c$ which are secured on the runners and lap upon said levers, the pivots being loosely inserted through perforations in the levers and firmly fixed in the runners.

Upon the lower ends of the levers 22 a curved toe $d$ is formed on each, and as appears in Figs. 2 and 4, the forward movement of the upper ends of the levers will lift the toes $d$ above the tread surface of the runners 10, and thus prevent their frictional contact with the ground or snow thereon.

At a suitable point on the reach bars 18, forward of the rear bolster bar 15, a cross bar $15^a$ is secured by its ends thereto, said cross bar having a central slot formed transversely therein, which receives a slide bar $15^b$ that extends forwardly, and is secured centrally in a cross head $15^c$, the ends of which have slidable engagement with the reach bars 18.

A link rod $22^a$ is loosely secured by one end thereof upon the upper end of a respective brake lever 22, and from each lever said link rods extend forwardly, and at their front ends are loosely connected upon respective ends of a rocker bar $20^b$, that is centrally pivoted upon the lower side of the cross head $15^c$. It will be noted that a forward sliding movement of the cross head $15^c$ and slide bar $15^b$, will elevate the toes $d$ from the ground and a rearward movement thereof will depress them.

Novel means for controlling the rocking movement of the levers 22 will now be described. In the slide bar $15^b$ a plurality of spaced perforations $e$ are formed near the free rear end thereof, and upon the rear side of the cross bar $15^a$ a locking lever $15^d$ is pivoted near its center of length. On one end of the lever $15^d$ that projects over the rear portion of the slide bar $15^b$, a depending toe $g$ is formed that may enter any one of the perforations $e$, that may be disposed rearward of and near to the cross bar $15^a$ by a rearward adjustment of the cross head $15^c$ and the slide bar $15^b$. A guard plate $g'$, that is offset and is secured by one end portion upon the rear side of the cross bar $15^a$, is loosely engaged with the outer side of the toe $g$ and serves to guide it into an alined perforation $e$.

The lever $15^d$ is preferably extended below one of the reaches 18, and near its outer end is bent upward, thus producing an upright limb thereon, upon the upper end of which a latch bar $15^e$ is loosely secured. It will be seen that by rocking the latch bar $15^e$ upward and then pressing it downward the lever $15^d$ will be rocked and the toe $g$ be removed from the perforation $e$ that it may have been located in. Further a reverse movement of the latch bar $15^e$, that is to say, pulling upon it will depress the toe and cause it to enter a perforation $e$ that may be disposed directly below it by an adjustment of the slide bar $15^b$.

A means for holding the toe $g$ engaged within a selected perforation $e$ consists of the following details. Two ears $h$, $h'$ are spaced apart and projected from the front side of the cross bar $15^a$ directly opposite the locking lever $15^c$, one of the said bars $h$ being stationary, and the other ear $h'$ formed on one end of a pusher bar $h^2$, that is slidably supported on the cross bar $15^a$ and projects outward therefrom at the same side of the reach bar as does the latch bar $15^e$. A coiled spring $h^3$ is mounted upon a carrier rod $h^4$ that is fixed at one end thereof in the ear $h$ and projects loosely through the ear $h'$. In the lower edge of the pusher bar $h^2$ a notch is formed that will receive a projection on the reach bar that is below it, and when the pusher bar is pressed inward and downward so as to interlock the projection within the notch, the pusher bar will be disposed at its free outer end flush with the outer side of the reach bar, these parts being shown in Fig. 7.

It will be seen that if the latch bar $15^e$ has been manipulated for effecting a locking engagement of the toe $g$ on the lever $15^d$ within a perforation $e$, and then folded toward the outer end of the pusher bar $h^2$, and seated in keeper loops $i'$, $i'$, secured on the adjacent reach bar 18, the projected end of the pusher bar will lap upon the end portion of the latch bar $15^e$ and prevent it from rising, which will obviously prevent the toe $g$ on the lever $15^d$ from becoming disengaged from the slide bar $15^b$, this engagement appearing in Fig. 4.

It is a feature of the invention to provide means for causing the brakes to operate for retarding or arresting the movement of the sled on a level roadway or on an inclined road, either going uphill or down as the case may be. To this end a lever is provided, consisting of two members 23, $23^a$, that are so connected together as to permit the extension of the member $23^a$ endwise from the member 23, a box $m$ being formed on the side of the member 23, that receives the other member and permits its longitudinal adjustment.

To connect the two part lever with the slide bar $15^b$ for a reciprocation of the reach bar 18, cross head 15°, and rocking adjustment of the brake levers 22, an arm 24 is secured by one end on the cross bar 15ª and thence projects over the two part lever, the extended end of the arm being pivoted upon the portion 23 of the lever near the end thereof from which the other member 23ª projects when extended. The opposite end portion of the two part lever is slotted longitudinally, as shown at n, in Figs. 1 and 5, and through said slot the end portion of the lever that laps upon the slide bar 15ᵇ is pivoted upon said slide bar, as shown at o in the views mentioned.

It will be seen that if the toe g is removed from a perforation e, near the end of the slide bar 15ᵇ, the extended member 23ª of the lever may readily be taken hold of, and if rocked rearwardly or toward the cross bar 15ª, the toes d on the lower ends of the brake levers 22 will be rocked down near to the tread surfaces of the runners 10.

It should be here explained that in case the road bed is impeded with frozen snow that the runners bed into, the toes d will operate effectively if adjusted near to the tread faces of the runners 10, which adjustment may be effected by locking the toe g in the rearmost perforation e, in the slide bar 15ᵇ, as represented in Figs. 1 and 5.

If it is essential that the toes d project below the runners when applied for retarding or stopping the sled, the slide bar is adjusted so that a perforation e therein which is farther from the end, is caused to aline with the toe g, whereupon the rearward rocking movement of the lever member 23ª will cause a corresponding downward movement of the toes d below the runners, and forcibly embed them in the frozen road bed.

The provision of the lever just described is of advantage when it is necessary to manually apply the brakes either on a hilly road bed or on the level.

When the lever is not in use, the portion 23ª is slid inwardly, and a hook p on the outer end thereof is engaged with an eye p' on the adjacent end of the other member 23 of said lever, which will retain the member 23ª in closed condition.

A draft pole 25 is loosely secured upon the front ends of the runners 10 for the front sled section A, by means of a cross bar 25ª, that is affixed upon the rear end of the pole.

In the operation of the brake levers 22, it will be evident from the foregoing description, that the lower bolster bar 17 and the attached reach bars 18, which together constitute a slidable frame, must receive limited longitudinal movement on the front top bolster 17ª, and the rear bolster 15, to effect a depression of the toes d of the brake levers 22. Further, when draft strain is applied upon the pole 25, the connection between the front sled section A and the lower bolster 17, will cause the latter to slide forward a distance limited by the length of the slot b in the upper bolster 17ª, and this will rock the toes d upward and out of contact with the road bed.

It is essential for the proper exertion of draft force by a team, in pulling a heavy load, that means be provided for securing the lower bolster and reach bars in rearward adjustment, which will correspondingly shorten the distance between the top bolster 17ª and the rear bolster 15. To this end a locking device is employed that by adjustment will releasably secure the rear portions of the reach bars 18 and the rear bolster 15 together, and thus prevent the reach bars from longitudinal movement.

As shown in Figs. 3 and 4, the locking device for the reach bars consists of the following details: Two locking bars 26, 26ª are loosely connected at their adjacent ends, as shown at r in Fig. 3, and at an equal distance from the loose connection r the locking bars are pivoted upon the rear side of the rear bolster 15, as indicated at s. Two keepers t, t are attached upon the rear bolster 15, near the reach bars 18, and loosely embrace the locking bars 26, 26ª. On the adjacent end of the locking bar 26ª a locking toe u is formed, that may be depressed and enter a perforation in a corresponding reach bar 18, by a downward rocking movement of the locking bar mentioned. The other locking bar 26, after passing through the keeper t, is extended toward the left end of the bolster 15 and near the free end of the locking bar a latching bar v is supported rockably on the bolster 15, said latching bar being adapted for holding the end portion of the locking bar 26 rocked upward or downward. A locking toe u' is formed on the locking bar 26 and may be entered within a perforation in the adjacent reach bar 18, by a depression of the free end of the locking bar, as shown in Fig. 3.

It will be noted that the relative connection of the parts is such, that a depression of the left end of the locking bar 26 will simultaneously depress both of the locking toes u, u', and cause them to enter the perforations in the reach bars 18.

It is to be understood that the perforations in the reach jars 18, which receive the toes u, u' are formed therein at such points as will dispose the brake levers 22, rocked forward sufficiently to remove the toes d thereon from contact with the road bed.

The reach locking device that has been described, serves to retain the brake levers in normal adjustment, and the two sections of the sled connected for effective service, when the draft bolt 21 is inserted down through the perforation in the wear plate 16.

It will be understood from the foregoing description, that the improved brake embodies means for a manual adjustment of the brakes to engage the road bed, set the brake levers so that their toes will lightly or forcibly engage the surface of the road while moving on a hilly road or on the level, and release the same at will, and afford means for locking the brake levers in a position that removes their toes from having contact with the road bed until manually released.

Having thus described my invention, I claim as new and desire to secure by Letters Patent:

1. The combination with two sled sections, a stationary frame connecting said sections, a twin frame slidable below and in contact with the stationary frame, two brake levers pivoted on runners for the rear sled section, a cross head slidable on the side members of the lower frame, and links connecting the ends of the brake levers with the cross head, of a rockable lever extended laterally for manipulation and adapted for sliding the cross head and rocking the brake levers.

2. The combination with two sled sections, a stationary frame connecting said sections, a twin frame slidable below and in contact with the stationary frame, two brake levers having depending toes and pivoted on the runners of the rear sled section, a cross head slidable on the side members of the lower frame, and links connecting the upper ends of the brake levers with the cross head, of a longitudinally extensible lever pivoted on a projection from the cross head and upon an arm supported on the lower frame, said lever by manipulation sliding the cross head and rocking the brake lever.

3. The combination with two sled sections, a stationary frame connecting said sections, a twin frame slidable below and in contact with the other frame, two brake levers having depending toes and pivoted on the runners of the rear sled section, a cross bar on the lower frame having a transverse slot therein, a cross head having a slide bar that is adjustable in the slotted cross bar, and two links connecting the upper ends of the brake levers with the cross head, of a longitudinally extensible lever pivoted on the slide bar, a bracket arm extended from the cross bar and pivoted upon the extensible lever, and means for holding the lever extension retracted.

4. The combination with two sled sections, a stationary frame connecting said sections, a twin frame slidable below and in contact with the stationary frame, a fixed cross bar on the slidable frame having a transverse slot therein, a cross head slidable on the side members of the slidable frame, and a slide bar extended from the cross head and passing through the slotted perforations therein, of a locking bar pivoted on the rear side of the cross bar, and having a depending toe thereon that may engage either perforation in the slide bar when depressed, a latch bar on the outer end of said locking bar, and means for holding the latch bar adjusted so as to retain the toe of the locking bar depressed within an engaged perforation in the slide bar.

5. The combination of two sled sections, a stationary frame connecting said sections, a twin frame slidable below and in contact with the stationary frame, the side members of the slidable frame passing through slots in a rear bolster that is part of the stationary frame, each of said side members having a perforation therein, and two rockable locking bars each having a depending toe thereon that will enter a respective perforation and hold the side members of the slidable frame stationary.

In testimony whereof I have signed my name to this specification in the presence of two subscribing witnesses.

EBEN G. DOLAND.

Witnesses:
   WALTER N. BALDWIN,
   JESSE L. CARPENTER.